(No Model.) 3 Sheets—Sheet 1.

F. L. SENOUR.
CORN AND SUGAR CANE HARVESTER.

No. 366,797. Patented July 19, 1887.

(No Model.) 3 Sheets—Sheet 2.

F. L. SENOUR.
CORN AND SUGAR CANE HARVESTER.

No. 366,797. Patented July 19, 1887.

Witnesses.
Chas. R. Burr.
Fred F. Church.

Inventor:
Frank Leroy Senour
by Franck D. Johns
his Attorneys.

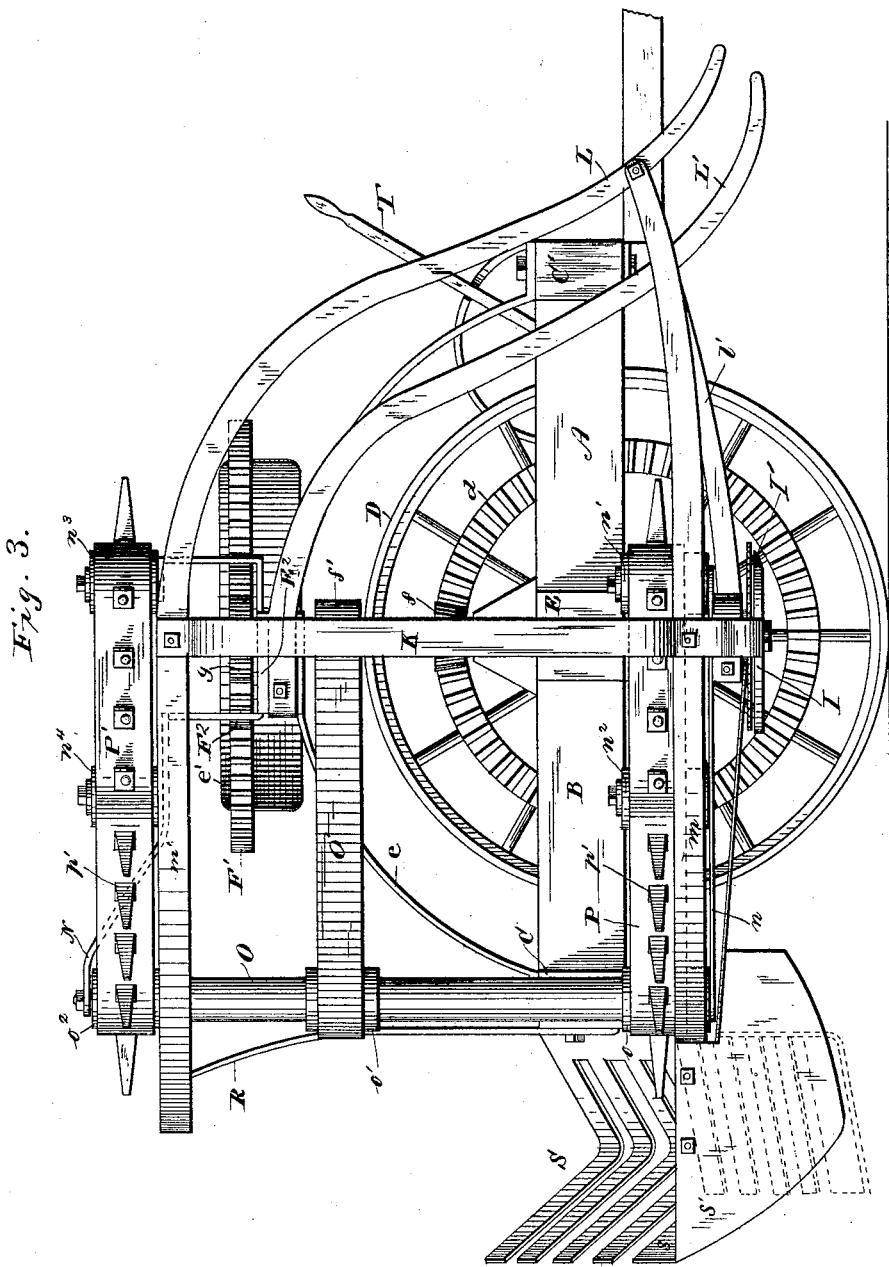

UNITED STATES PATENT OFFICE.

FAUNT LEROY SENOUR, OF NEW ALEXANDRIA, PENNSYLVANIA.

CORN AND SUGAR-CANE HARVESTER.

SPECIFICATION forming part of Letters Patent No. 366,797, dated July 19, 1887.

Application filed February 16, 1886. Serial No. 192,135. (No model.)

*To all whom it may concern:*

Be it known that I, FAUNT LEROY SENOUR, a citizen of the United States, residing at New Alexandria, in the county of Westmoreland and State of Pennsylvania, have invented certain new and useful Improvements in Corn and Sugar-Cane Harvesters; and I do hereby declare the following to be a full, clear, and exact description of the invention, such as will enable others skilled in the art to which it appertains to make and use the same.

My invention relates to improvements in corn and sugar-cane harvesters; and it consists in certain novelty of construction and arrangement of the various parts, all of which I will now proceed to point out and describe, reference being had to the accompanying drawings, in which—

Figure 1:
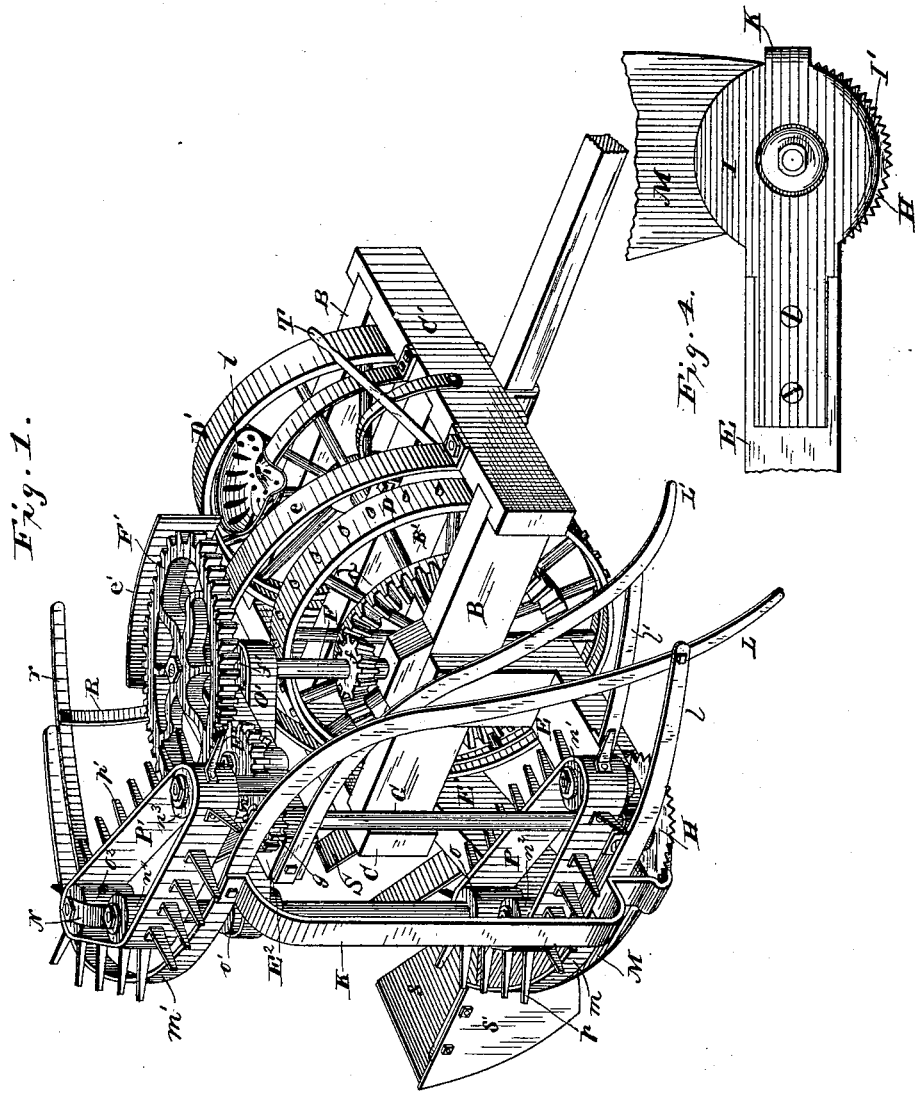
Figure 2:
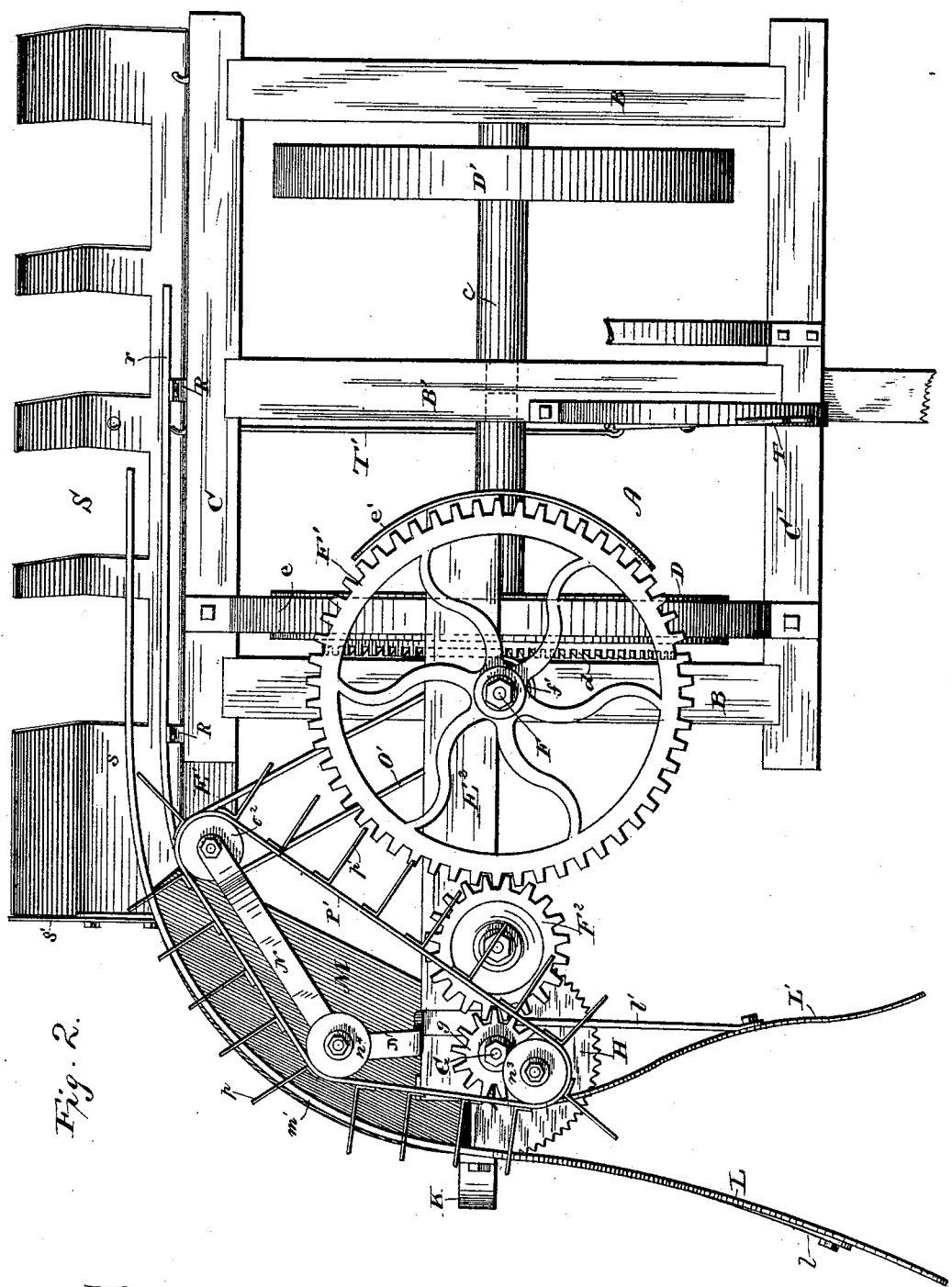

Figure 1 is a perspective of a harvester embodying my invention. Fig. 2 is a top plan view of the same; Fig. 3, a side elevation, and Fig. 4 a detail.

Referring to said drawings, A is the main frame of the machine, composed of the side bars, B B, center bar, B', and cross-bars C C'. On the under side of the side and center bars are suitable bearings, in which is mounted the axle $c$, which is formed in two independent sections, $c'$ $c^2$.

D D' are the main driving and carrying wheels of the machine. They may be located on the inside of the frame, as shown in the drawings, or, if desired, may be placed on the outside of the frame.

E is an angle-bar secured to one of the bars B at a point in a line with the axle, the lower arm of said bar projecting out from the side of the main frame.

E' is a laterally-projecting and downwardly-inclined bar secured to the under side of the rear cross-bar, C.

$e$ is a curved support having its ends fastened to the cross-bars C C', and extending over the driving-wheel D. To the center of the support is secured a bar, $E^2$, projecting directly over the bar E. These bars E, E', and $E^2$ form the frame supporting the operating mechanism of the machine.

F is a vertical shaft mounted in bearings on the side bar, B, and bar $E^2$. The outer side of the driving-wheel D is provided with a beveled gear, $d$, which engages with a beveled pinion, $f$, on the shaft F.

F' is a large horizontal gear-wheel on the upper end of the shaft F.

$e'$ is a guard on the inner end of the bar $E^2$.

$F^2$ is a horizontal pinion mounted on an arbor secured to the bar $E^2$ and engaging with the gear F'.

G is a vertical shaft mounted in bearings on the outer ends of the bars E and $E^2$.

$g$ is a pinion on the upper end of the shaft G, which pinion engages with the pinion $F^2$. On the lower part of the shaft G is secured a circular-saw cutter, H.

I is a protecting-plate secured to the bar E immediately under the circular cutter H. Said plate is concentric with the cutter H. Its rear half is of the same radius and its forward half of slightly less radius than said cutter, the teeth of which project slightly beyond the forward edge, I', of the plate. Said forward edge, I', is beveled, so that the plate readily passes over the stubble as the stalks are severed. This plate serves to protect the cutter from the stubble, stones, &c.

K is a vertical standard secured to the outer side of the plate I.

L is a downwardly-inclined guide-arm secured to the top of the standard, and projecting in front of and on the outside of the cutter. $l$ is a brace secured to the lower end of the arm L and standard K. L' is a similarly inclined guide-arm secured to the end of the bar $E^2$ and projecting down in front of and on the inside of the cutter. $l'$ is a brace secured to the arm L' and bar E. These guide-arms serve to guide the stalks to the cutter, and also lift up any stalks that may have fallen.

M is a slightly-inclined plate secured to the ends of the bars E E' and projecting partially over the cutter. Said plate is curved and extends around to the rear of the machine. When the stalks are cut, their butts rest on this plate as they are carried along the same by the conveyers, hereinafter described.

$m$ is a curved guide-bar secured to the standard K at a point just above the plate M. This guide-bar extends around to a point above the rear end of the plate, and its curve conforms to the curve of the outer edge of said guideway. Said guide-bar engages with the lower part of the stalks and prevents them from slipping off the plate.

M' is a guide-bar secured to the top of the standard K and extending around nearly to the center of the main frame of the machine. This guide-bar is directly over the guide-bar $m$, and conforms to the curve of said guide-bar $m$.

N is a bar secured to the outer end of the bar $E^2$ and extending back to a point over the outer end of the bar E'.

O is a vertical shaft mounted in bearings on the ends of the bars E' and N.

$o$, $o'$, and $o^2$ are pulleys on the shaft O.

$f'$ is a pulley on the shaft F.

O' is an endless belt connecting the shafts O and F, and by means of which motion is imparted to the shaft O. Instead of using an endless belt and pulleys, an endless chain and sprocket-wheels may be used.

$n$ is a bar secured to the outer ends of the bars E and E'.

$n'$ is a pulley mounted on an arbor secured to the outer end of the bar $n$, and $n^2$ a pulley mounted on an arbor secured to the bar $n$ at a point near its center.

P is an endless conveyer provided with fingers $p$. Said conveyer passes around the pulleys $o$ $n'$ $n^2$ and receives its motion as the shaft O is revolved. The fingers $p$ project beyond the cutter as they pass around the roller $n'$, and also extend over the guide $m$.

$n^3$ is a pulley mounted on an arbor secured to a projection on the bar N, and $n^4$ is a pulley mounted on an arbor near the center of the bar N.

P' is an endless conveyer provided with fingers $p'$. Said conveyer passes around the pulleys $o^2$, $n^3$, and $n^4$, and receives its motion as the shaft O revolves. The fingers $p'$, projecting over the guide $m'$, engage with the upper part of the stalks. If desired, the forward pulleys, $n'$ $n^3$, may be placed on the shaft G. The endless conveyers will then be operated as said shaft revolves, and the endless belt or chain O' may be dispensed with. Instead of the endless belts $a$, endless chains may be used and sprocket-wheels instead of the pulleys. The fingers are secured to the conveyers in any suitable manner.

R R are uprights secured to the rear cross-bar, C. On the top of said uprights is a guide, $r$, extending from the shaft O nearly across the machine and in a line parallel with the rear portion of the guide $m'$. This guide prevents the stalks from falling on the machine.

S is a tilting stalk carrier and dropper hinged to the rear of the main frame and bar E. Said carrier and dropper extends from the rear end of the plate M across the rear of the machine. The carrier and dropper is also inclined, and the end approximate to the plate is lower than said plate. The end $s$ is solid, and as the stalks leave the plate M their butts will fall on the solid portion of the carrier and dropper.

T is a locking-lever, and T' a connecting-rod, by means of which the carrier and dropper is held in position to retain the stalks. When it is desired to empty the carrier and dropper, the lever is released, and the said carrier and dropper falls to the position shown in dotted lines and dumps the stalks.

$s'$ is a plate secured to the end of the bar E', and, extending down across the end of the carrier and dropper, prevents the stalks from slipping out.

$t$ is the driver's seat.

The operation of my invention is as follows: The inclined guide-arms L L' pass on either side of a row of corn and guide the stalks toward the cutter. Said arms also lift up any stalks that have fallen and guide them in an upright position to the cutter. The cutter is revolved by the train of gearing connecting the shaft on which it is mounted with the main driving-wheel. The fingers on the conveyers as they move around the forward pulleys engage with the upper and lower part of the stalks and guide them to the cutter. As the stalks are cut, they are moved backward by the fingers between the conveyers and the curved guides $m\,m'$, the butts of the stalks resting and sliding on the plate M. As they reach the end of the plate, the butts will drop down on the solid portion of the carrier and dropper S. The fingers on the conveyers then release the stalks as they pass around the pulleys $o\,o^2$, and said stalks fall into the rack. The guide $r$ and rear end of the guide $m$ prevent said stalks from falling on the machine or out of the carrier and dropper. To empty the carrier and dropper, the driver releases the lever, and the carrier and dropper will fall to the position shown in dotted lines and dump the stalks.

Any desired changes may be made in the number of wheels in the train of gearing connecting the cutter with the driving-wheel, to increase or diminish the speed of said cutter.

Having thus fully described my invention, I claim as new and desire to secure by Letters Patent—

1. In a corn or cane harvester, the cutter H, plate M, extending from the cutter to the rear of the machine, the upper and lower guide-bars, $m\,m'$, and rear guide-bar, $r$, and the upper and lower endless conveyers, P P', in combination with the tilting inclined carrier and dropper S, hinged to and extending across the rear of the machine, and having its lower end proximate to and below the rear end of the plate M, and provided with suitable operating mechanism, and the retaining-plate $s'$, extending across the lower end of said carrier and dropper, all arranged and operating substantially as shown and described.

2. In a corn or cane harvester, the cutter H, having the protecting-plate I, the plate M, extending from the cutter to the rear of the machine, the inclined guide-arms L L', the upper and lower guide-bars, $m\ m'$, and rear guide, $r$, and the upper and lower endless conveyers, P P', in combination with the tilting inclined carrier and dropper S, hinged to and extending across the rear of the machine, and having its lower end proximate to and below the rear end of the plate M, and provided with suitable operating mechanism, and the retaining-plate $s'$, extending across the lower end of said carrier and dropper, all arranged and operating substantially as shown and described.

In testimony whereof I affix my signature in presence of two witnesses.

FAUNT LEROY SENOUR.

Witnesses:
 A. R. MURPHY,
 H. S. SWEITZER.